(12) United States Patent
Izatt et al.

(10) Patent No.: US 9,864,183 B2
(45) Date of Patent: Jan. 9, 2018

(54) SYSTEMS AND METHODS FOR STRUCTURED ILLUMINATION SUPER-RESOLUTION PHASE MICROSCOPY

(71) Applicant: Duke University, Durham, NC (US)

(72) Inventors: Joseph A. Izatt, Raleigh, NC (US); Shwetadwip Chowdhury, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 245 days.

(21) Appl. No.: 14/250,846

(22) Filed: Apr. 11, 2014

(65) Prior Publication Data

US 2015/0077535 A1  Mar. 19, 2015

Related U.S. Application Data

(60) Provisional application No. 61/811,665, filed on Apr. 12, 2013, provisional application No. 61/935,499, filed on Feb. 4, 2014.

(51) Int. Cl.
*G02B 21/36* (2006.01)
*G02B 5/18* (2006.01)
(Continued)

(52) U.S. Cl.
CPC ............. *G02B 21/361* (2013.01); *G02B 5/18* (2013.01); *G02B 21/06* (2013.01); *G02B 21/086* (2013.01);
(Continued)

(58) Field of Classification Search
CPC ...... G02B 21/06; G02B 21/086; G02B 21/14; G02B 21/361; G02B 2002/1804; G02B 5/18; H04N 5/2256
See application file for complete search history.

(56) References Cited

U.S. PATENT DOCUMENTS 5,715,081 A * 2/1998 Chastang ............. G02B 5/1828
356/521
9,207,638 B2 * 12/2015 Dubois ................. G02B 21/00
(Continued)

FOREIGN PATENT DOCUMENTS

WO  2012/109301 A2  8/2012
WO  2013/008033 A1  1/2013

OTHER PUBLICATIONS

Witte, S., Plauş ka, A., Ridder, M. C., van Berge, L., Mansvelder, H. D., & Groot, M. L. (2012). Short-coherence off-axis holographic phase microscopy of live cell dynamics. Biomedical Optics Express, 3(9), 2184-2189. http://doi.org/10.1364/BOE.3.002184.*

*Primary Examiner* — Christopher S Kelley
*Assistant Examiner* — Maria Vazquez Colon
(74) *Attorney, Agent, or Firm* — Olive Law Group, PLLC

(57) ABSTRACT

Systems and methods for structured illumination super-resolution phase microscopy are disclosed. According to an aspect, an imaging system includes a light source configured to generate light. The system also includes a diffraction grating positioned to receive and diffract the output light. The system also includes a sample holder positioned to receive the diffracted light for transmission through a sample. Further, the system includes an image detector positioned to receive the light transmitted through the sample and configured to generate image data based on the received light. The system also includes a computing device configured to apply subdiffraction resolution reconstruction to the image data for generating an image of the sample.

22 Claims, 10 Drawing Sheets

(51) Int. Cl.
  *G02B 21/06*  (2006.01)
  *H04N 5/225*  (2006.01)
  *G02B 21/08*  (2006.01)
  *G02B 21/14*  (2006.01)

(52) U.S. Cl.
  CPC .......... *G02B 21/14* (2013.01); *H04N 5/2256* (2013.01); *G02B 2005/1804* (2013.01)

(56) References Cited

U.S. PATENT DOCUMENTS

| | | | |
|---|---|---|---|
| 2009/0225407 A1* | 9/2009 | Nakayama | G02B 21/16 359/370 |
| 2011/0122487 A1 | 5/2011 | Perelman et al. | |

* cited by examiner

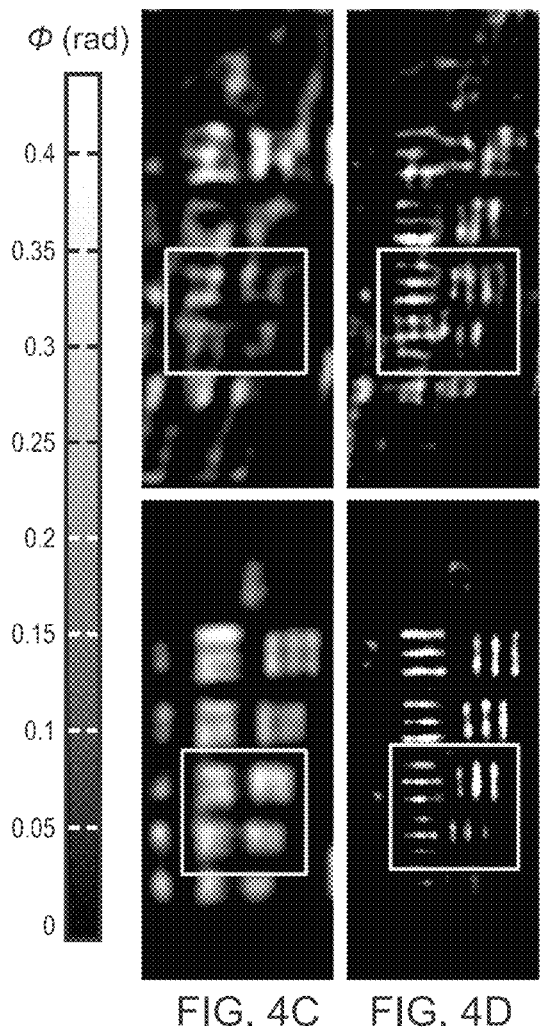
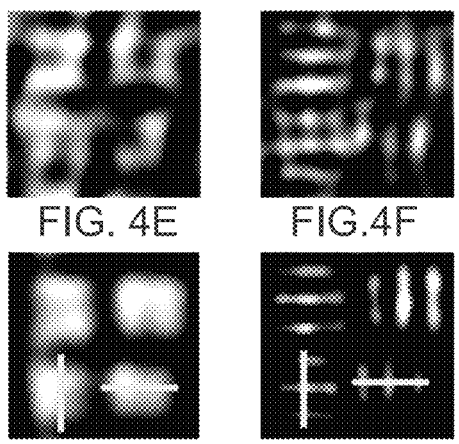
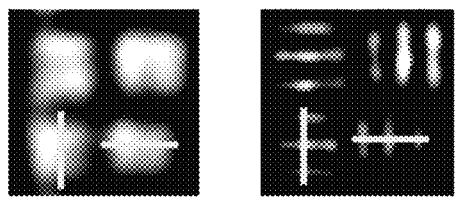
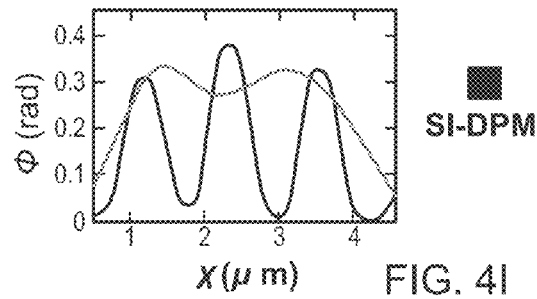
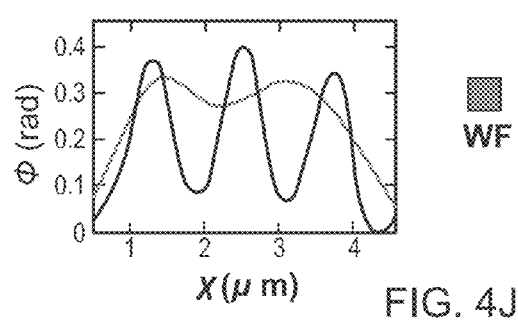
FIG. 4A  FIG. 4B
FIG. 4C  FIG. 4D
FIG. 4E  FIG. 4F
FIG. 4G  FIG. 4H
FIG. 4I
FIG. 4J

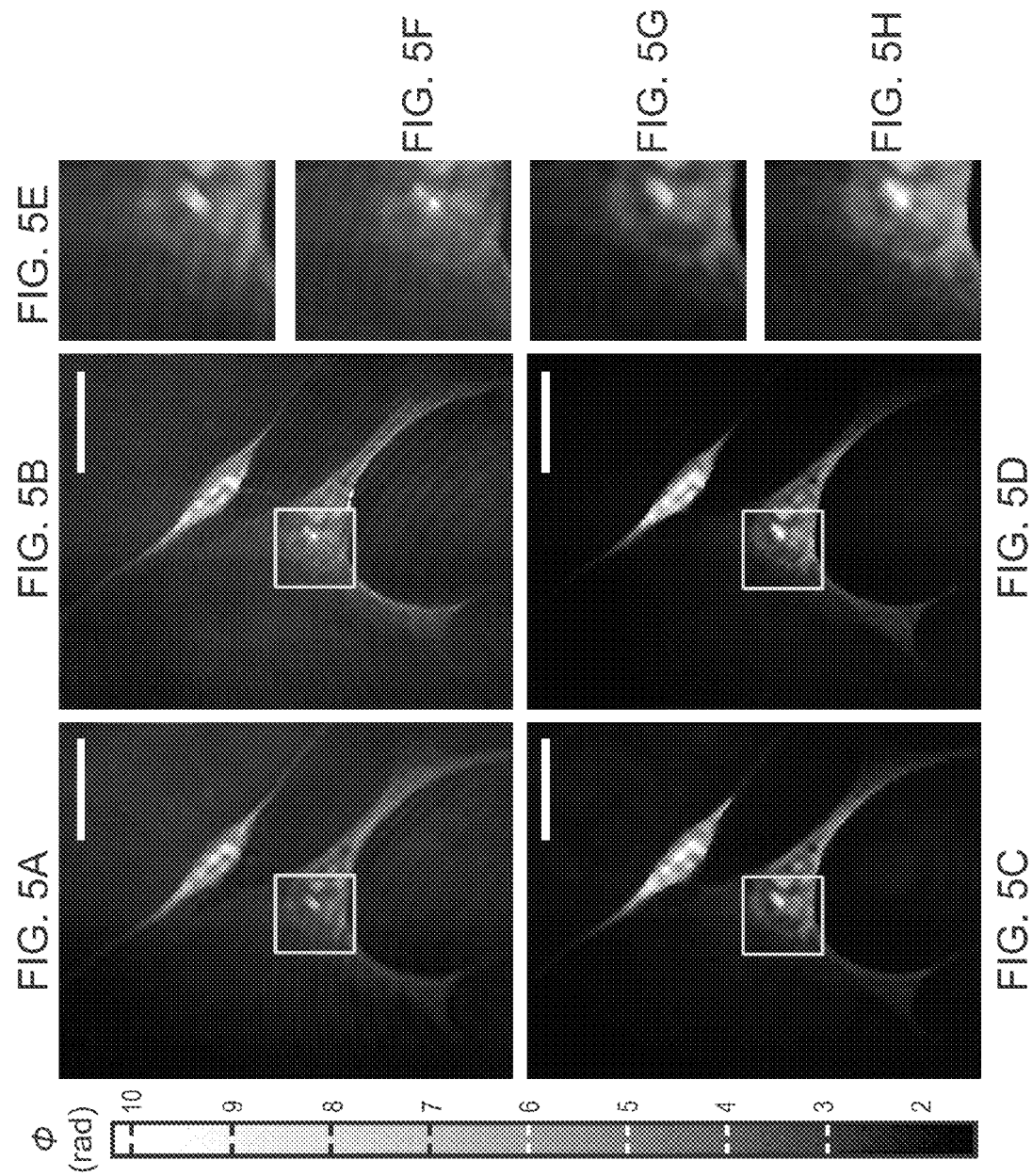

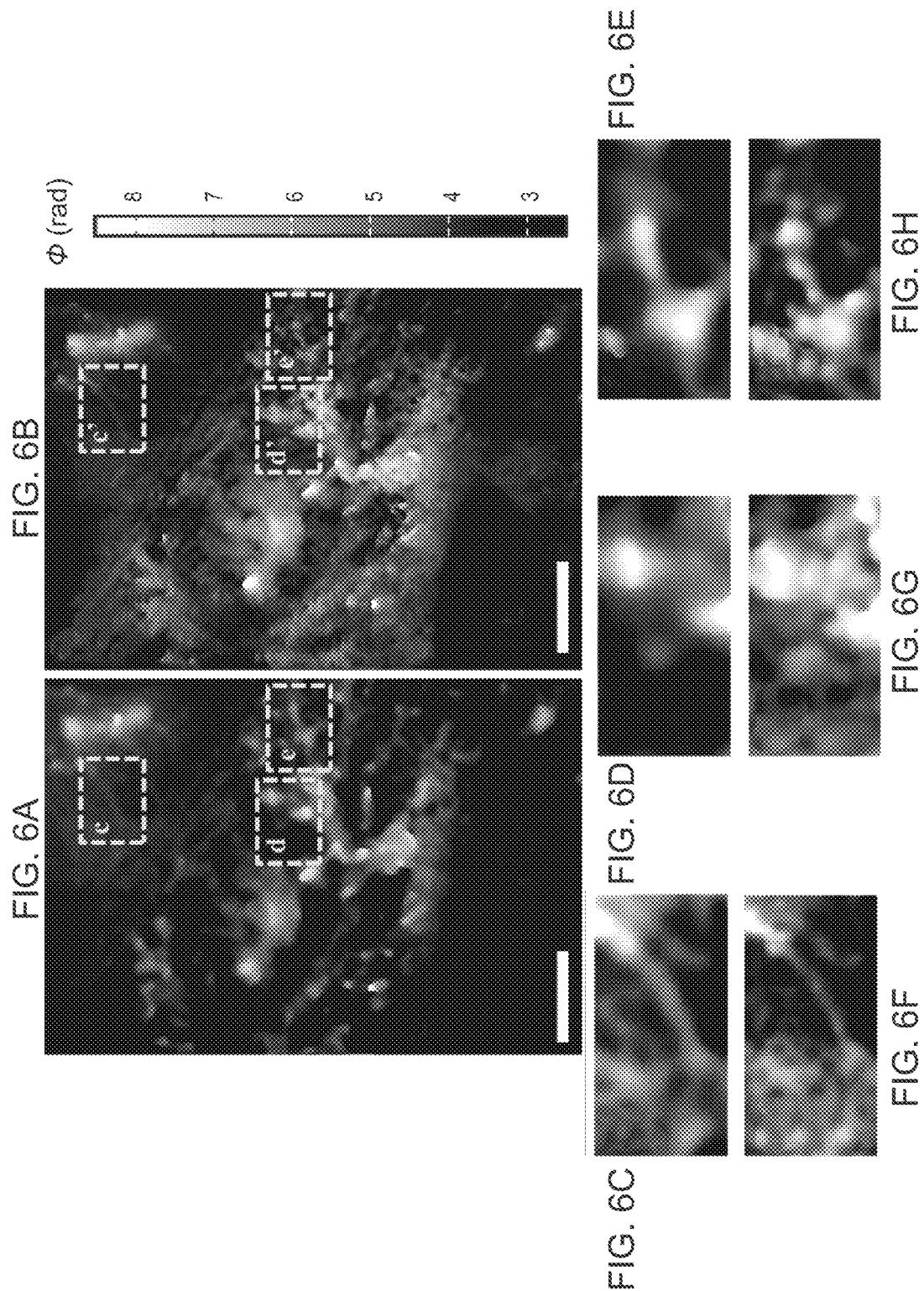

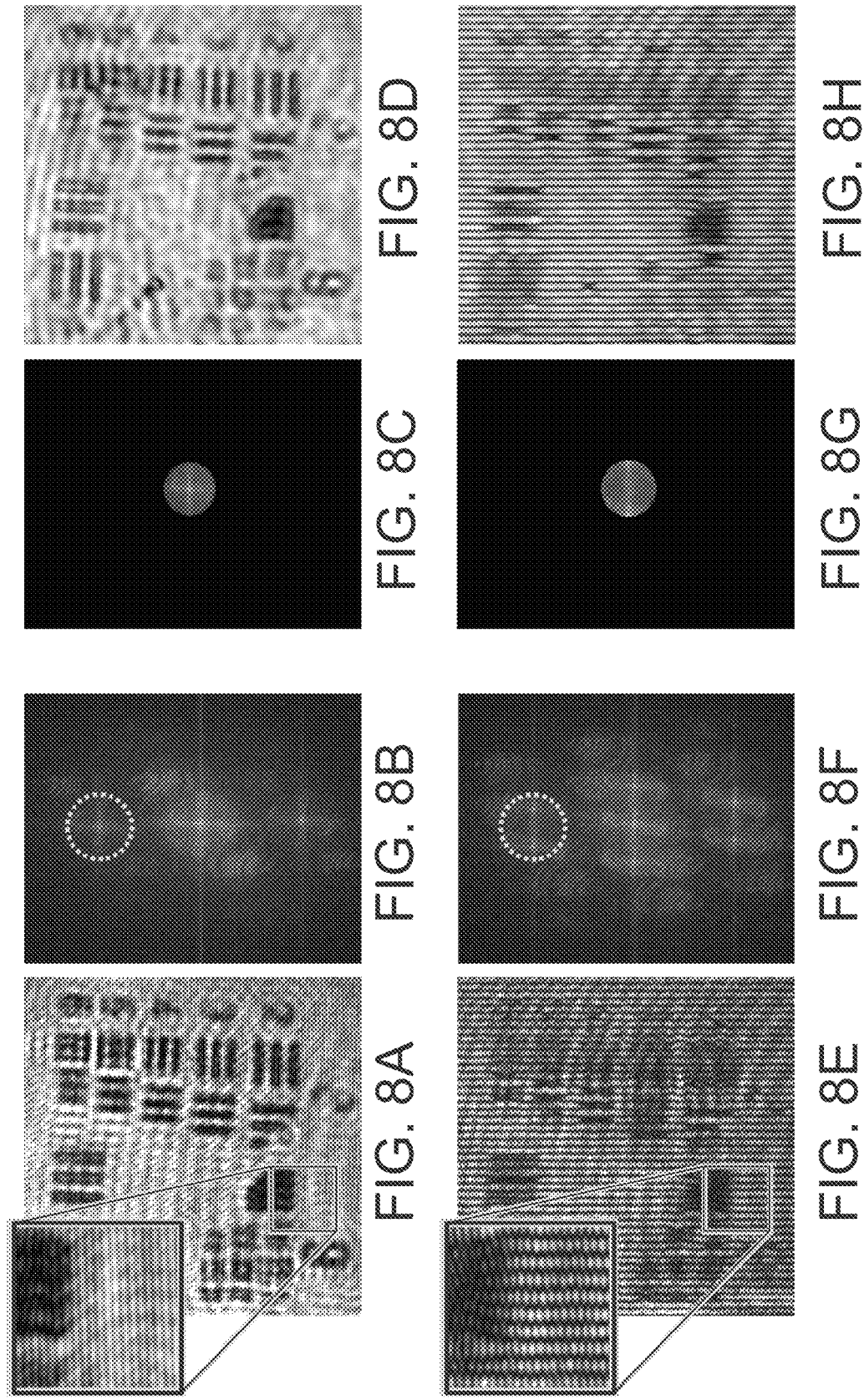

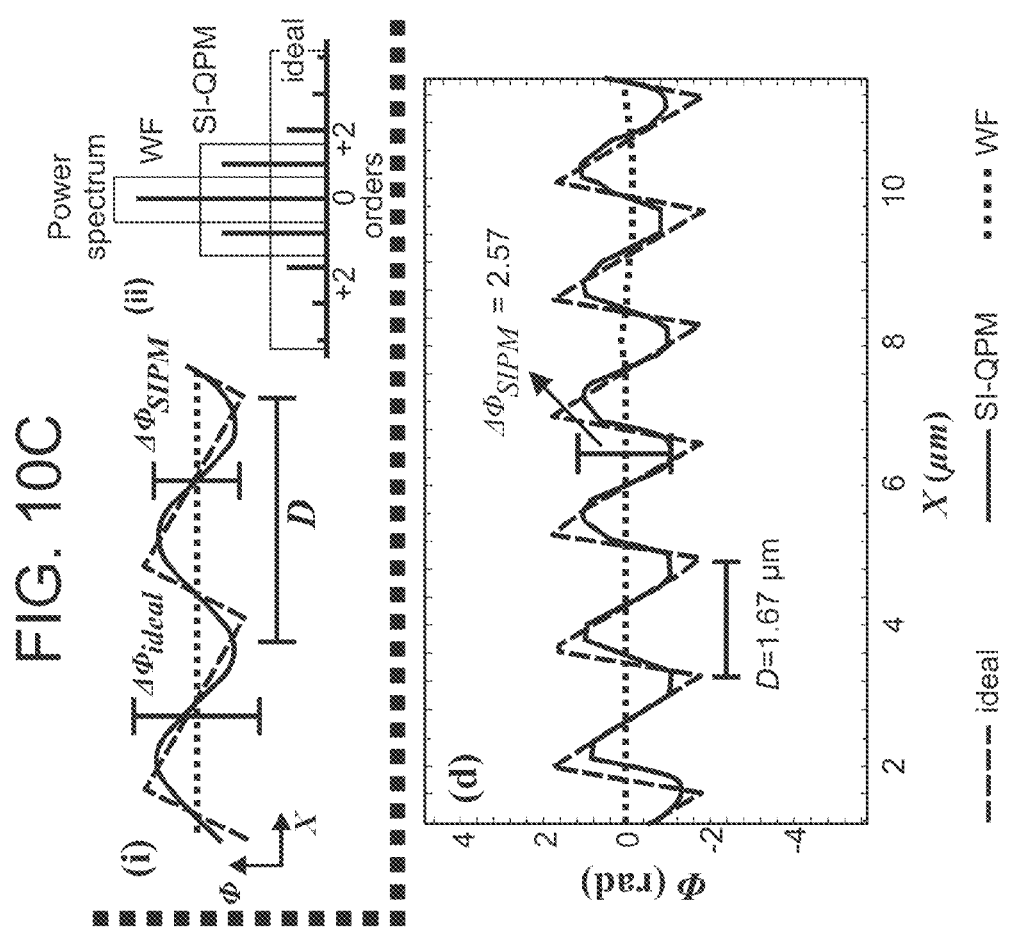
FIG. 10C
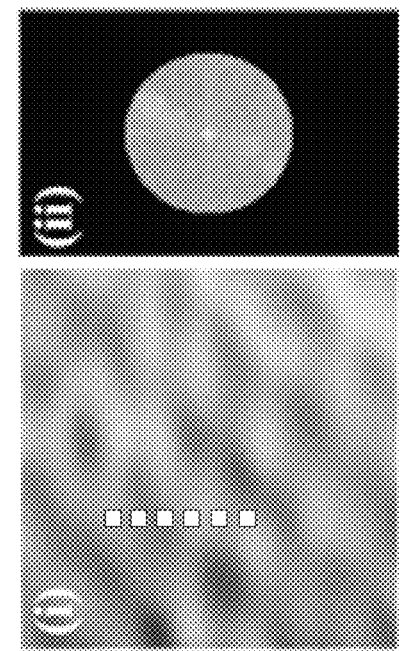
FIG. 10A
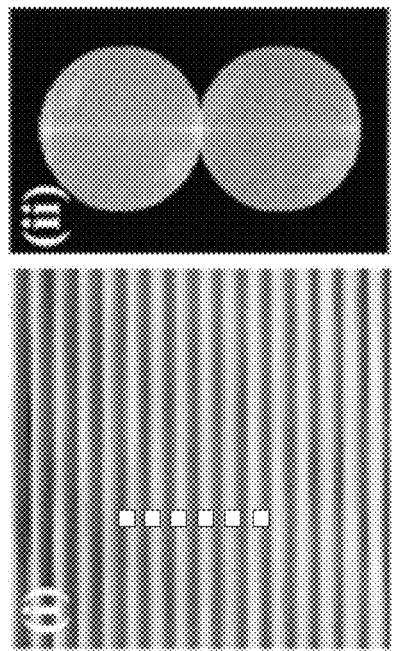
FIG. 10B
FIG. 10D

SYSTEMS AND METHODS FOR STRUCTURED ILLUMINATION SUPER-RESOLUTION PHASE MICROSCOPY

CROSS REFERENCE TO RELATED APPLICATIONS

This application claims the benefit of U.S. Provisional Patent Application No. 61/811,665, filed Apr. 12, 2013 and titled STRUCTURED ILLUMINATION SUPER-RESOLUTION PHASE MICROSCOPY AND METHODS OF USE, and claims the benefit of U.S. Provisional Patent Application No. 61/935,499, filed Feb. 4, 2014 and titled BROADBAND STRUCTURED ILLUMINATION SUPER-RESOLUTION PHASE MICROSCOPY FOR SPECKLE-REDUCED IMAGING; the disclosures of which are incorporated by reference in their entireties.

FEDERALLY SPONSORED RESEARCH OR DEVELOPMENT

The technology disclosed herein was made with government support under grant number CBET-0933059, awarded by the National Science Foundation (NSF), and under grant number T32 EB001040, awarded by National Institutes of Health (NIH). The United States government may have certain rights in the technology.

TECHNICAL FIELD

The present disclosure relates to imaging. More particularly, the present disclosure relates to super-resolution phase microscopy and methods of use.

BACKGROUND

In biological microscopy, there has always been a continued drive towards increasing imaging resolution for relevant samples. In many cases, this drive translates to designing better optical systems to optimize for aberrations and resolution to achieve diffraction-limited performance. However, in cases where optical design has capped off and better resolution is still required, this drive leads to a need to extend the imaging resolution beyond the system's diffraction limit. Such a need has driven the development of many unique sub-diffraction imaging techniques that have made large impacts for microscopy.

These set of techniques can largely be divided into two classes. The first class of techniques is targeted towards situations where the sample is coherently illuminated and diffracts into the imaging system's aperture. In such cases, the general strategy to obtain sub-diffraction resolution makes use of the fact that imaging resolution is simply one of a few degrees of freedom that describe the imaging system. Though the total number of degrees of freedom is invariant, one can sacrifice the less relevant ones, such as temporal, polarization, or field-of-view constraints, to improve the final image resolution to beyond the conventional diffraction limit.

The second class of sub-diffraction resolution imaging techniques is a more recent development that has found great impact in biological fluorescence imaging. By appropriately utilizing properties of fluorophores, one can visualize a fluorescent sample at "super" resolutions beyond the diffraction limit. This class of "super-resolution" techniques is further subdivided into two main categories. The first main category is based on single molecule localization, where individual fluorescent emitters are localized at sub-diffraction resolution for each raw acquisition, and then aggregated into one final super-resolved image. Examples of such techniques include photoactivated localization microscopy (PALM) and stochastic optical reconstruction microscopy (STORM). The second category of super-resolution techniques uses spatially modulated excitation to narrow the effective imaging point-spread-function. Either this is done directly, as in stimulated emission depletion (STED) and ground-state depletion (GSD), or indirectly after post-processing, as in structured illumination microscopy (SIM). Out of these super-resolution techniques, SIM holds the unique advantage of potential extensions to non-fluorescent samples, and has shown exciting potential for such cases.

One difficulty with super-resolution techniques is that such techniques require fluorescent samples, and thus are ill suited for samples that are either not fluorescent or cannot be easily fluorescently tagged. To this end, synthetic aperture techniques allow sub-diffraction resolution imaging of non-fluorescent, diffractive samples by acquiring multiple electric-field maps of the sample taken at different illumination angles. Different regions of the sample's spatial frequency spectrum are covered by each illumination angle, and taken together, an effective optical passband larger than the system's physical one can be synthesized.

In view of the foregoing, there is a need for improved microscopy systems and techniques that extend the typical super-resolution concepts towards application in non-fluorescent imaging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for structured illumination super-resolution phase microscopy. According to an aspect, an imaging system includes a light source configured to generate light. The system also includes a diffraction grating positioned to receive and diffract the output light. The system also includes a sample holder positioned to receive the diffracted light for transmission through a sample. Further, the system includes an image detector positioned to receive the light transmitted through the sample and configured to generate image data based on the received light. The system also includes a computing device configured to apply subdiffraction resolution reconstruction to the image data for generating an image of the sample.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIGS. 4A-4J depict quantitative phase images using (FIGS. 4A and 4B) laser illumination and (FIGS. 4C and 4D) broadband illumination, diffraction-limited images (FIGS. 4A and 4C) are also compared to enhanced resolution images (FIGS. 4B and 4D), close-ups of Group 8 E1 4-5 from (FIGS. 4A, 4B, 4C, and 4D) respectively, and vertical and horizontal cross cuts (FIGS. 4I and 4J) from diffraction-limited (WF) and SI-DPM images in FIGS. 4G and 4H, respectively;

FIGS. 5A-5H depict quantitative phase images of endothelial progenitor cells using broadband (FIGS. 5A and 5B) and laser illumination (FIGS. 5C and 5D); diffraction-limited images (FIGS. 5A and 5C) are also shown and compared to sub-diffraction resolution images (FIGS. 5B and 5D); and insets outlined by boxes shown in FIGS. 5A, 5B, 5C, and 5D are magnified and shown in FIGS. 5E, 5F, 5G, and 5H, respectively. The scale bar on top right corresponds to 10 µm.

FIGS. 6A-6H depict quantitative phase images of mesenchymal stem cells using broadband illumination are shown. Diffraction-limited images in FIG. 6A are compared to sub-diffraction resolution images in FIG. 6B. Select regions-of-interest are compared between the diffraction-limited image (FIGS. 6C, 6D, and 6E), and the sub-diffraction resolution image (FIGS. 6F, 6G, and 6H. The scale bar on the bottom left corresponds to 5 µm.

FIGS. 8A-8H depict images of holographic reconstructions for orthogonal (FIGS. 8A-8D) and structured illumination imaging (FIGS. 8E-8H) before post-processing for enhanced resolution; FIGS. 8A and 8E are raw interferograms at image plane for orthogonal and structured illumination imaging and associated Fourier spectra (FIGS. 8B and 8F); and FIGS. 8C and 8G are digitally filtered and DC centered spectra from (FIGS. 8B and 8F) and corresponding (FIGS. 8D and 8H) inverse Fourier reconstructions.

FIG. 9A shows diffraction limited image of sample under orthogonal illumination; FIGS. 9B and 9C show enhanced resolution amplitude reconstruction from horizontal and vertical sinusoidal structured illumination of sample; and FIG. 9D shows final enhanced resolution amplitude reconstruction containing enhanced resolution information in both orientations.

FIGS. 10A and 10B show diffraction-limited and enhanced-resolution images (i) and corresponding Fourier spectrum (ii), respectively, of blazed grating.

FIG. 10C shows simulated phase profile (i) of ideal and low-pass filtered grating and associated power spectrum (ii).

FIG. 10D shows experimental phase profiles from cross-cuts, as shown in the dashed line in (i) of FIGS. 10A and B, are plotted with respect to ideal phase profile.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
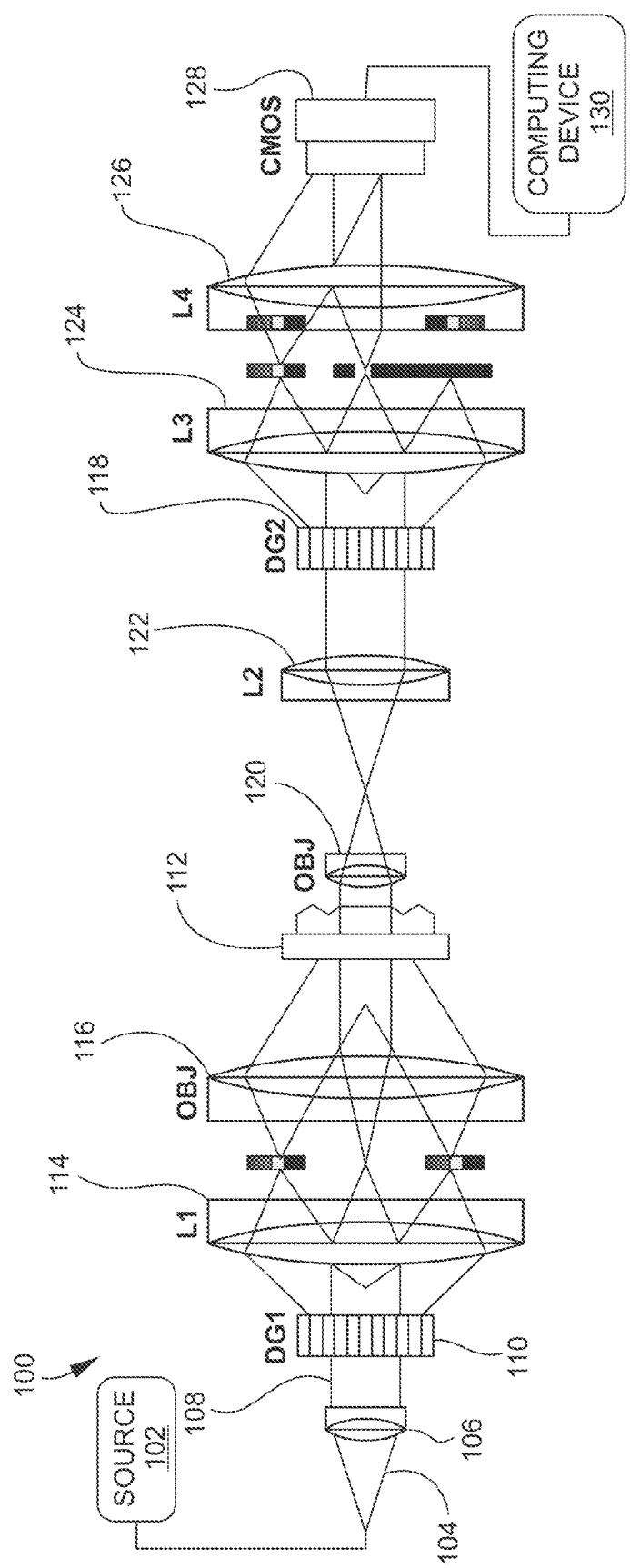
FIG. 1 is a schematic diagram of an example imaging system in accordance with embodiments of the present subject matter.

FIG. 1 illustrates a schematic diagram of an example imaging system, generally designated 100, in accordance with embodiments of the present subject matter. Particularly, this example system is a structured illumination diffraction phase microscopy (SI-DPM) system. Referring to FIG. 1, the system 100 utilizes a common-path reference wave for temporally stable off-axis interference and a broadband illumination source 102 for reduced coherent noise. The source 102 may output light 104 that provides broadband illumination. As an example, the source 102 may be a single mode super-continuum source provided by NKT Photonics A/S of Denmark, or any other suitable source. A suitable imaging component 106 may receive the output light 104 and collimate and spectrally filter the output light 104. The collimated and filtered light 108 output by the imaging component 106 may be directed to a diffraction grating 110 that is positioned to receive the light 108. The diffraction grating 110 may diffract the light 108 and downstream the light is transmitted through a sample held by a sample holder 112. Example samples include cells (e.g., unstained cells), transparent PDMS phantoms, and the like. In an example, the diffraction grating 110 may be a 50 1pmm diffraction grating or any other suitable diffraction grating.

The diffraction grating 110 may output light of +/−1 and 0 orders for imaging on the sample via a 4f lens system or any other suitable system. In this example, the 4f lens system includes a lens L1 114 and an objective OBJ 116. The 4f lens system creates the structured pattern that later allows for the subdiffraction resolution reconstruction. It is noted that in this example the $0^{th}$ order is not blocked and all non-0 orders exhibit spectral spreading in the Fourier planes of the grating. The sample with the structured pattern overlay is then imaged via a second 4f lens system onto a second diffraction grating 118. The second 4f lens system includes an objective OBJ 120 and a lens L2 122. In an example, the diffraction grating 118 may be a 50 1pmm diffraction grating or any other suitable diffraction grating.

Figure 3:
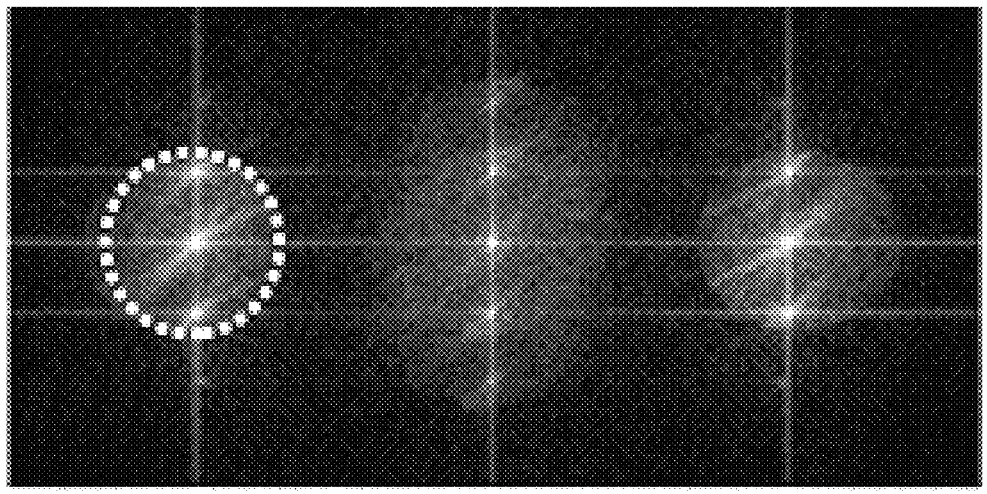
FIG. 3 depicts an image of a Fourier transform of raw interference pattern shown with a region of frequency-space to be filtered and DC centered outlined by dashed circle.
Figure 2:
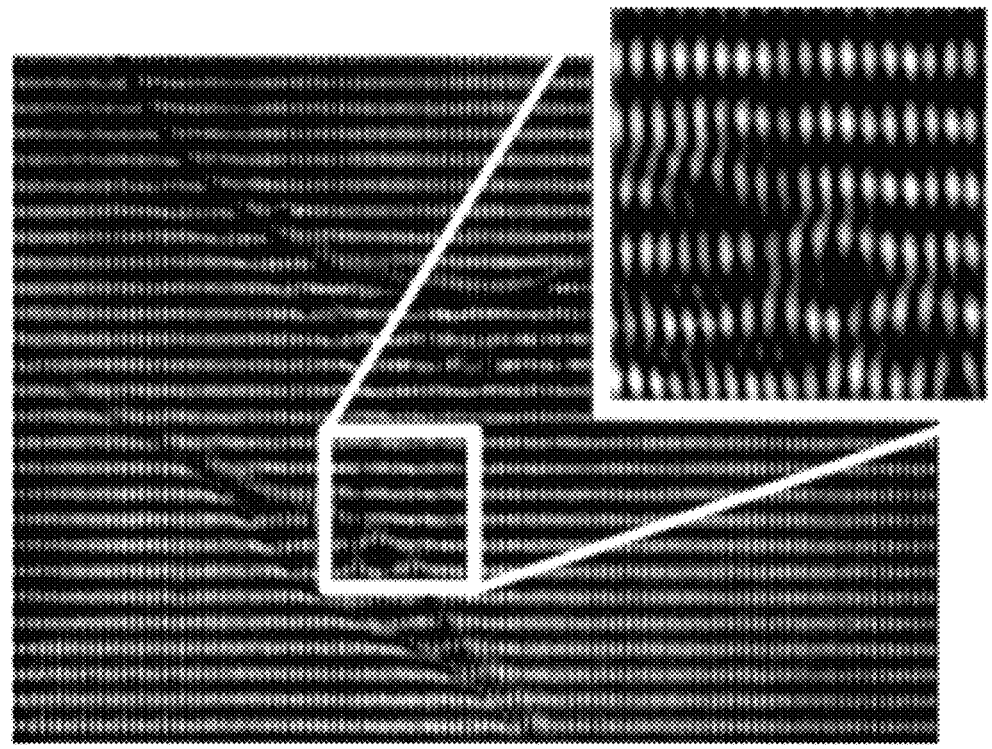
FIG. 2 depicts an image of a raw interferogram taken of endothelial progenitor cells showing the structured illumination pattern overlaid on the carrier spatial frequency.

The diffraction orders emerging from the diffraction grating 118 may be sent through a third 4f lens system, where a pinhole in the Fourier plane spatially filters the $0^{th}$ order, passes the whole spectral spread of the +1 order, and blocks all other orders. The third 4f lens system may include a lens L3 124 and a lens 126. The +1 order, containing the sample information, is then interfered with the filtered $0^{th}$ order, which now acts as the reference wave for off-axis holography. FIGS. 2 and 3 show an example of raw interferogram and its associated Fourier spectrum, respectively. It is noted that the inset of FIG. 2 shows the spatial frequencies from the structured illumination pattern competing with those from the off-axis interference with the reference wave. The sample field information may be retrieved by digitally filtering the region outlined by the dashed circle in FIG. 3, DC centering, and inverse Fourier transforming. Because of broadband illumination, SI-DPM can provide superior coherent noise rejection as compared to SI-QPM, thus offering improved spatial phase sensitivity. The common-path setup of the SI-DPM technique, apart from allowing high temporal phase stability, can be important for allowing broadband illuminated phase reconstruction over large field of view (FOV).

Following lens L4 126, the pattern from the sample may be imaged by an image detector 128. In this example, the image detector 128 includes a CMOS camera positioned to receive the light transmitted through the sample. Further, the image detector 128 is configured to generate image data based on the received light. The image detector 128 may be operatively connected to a computing device 130 for communication of the image data to the computing device 130 for processing. The computing device 130 may apply sub-diffraction resolution reconstruction to the image data for generating an image of the sample.

The computing device 130 may include suitable hardware, software, firmware, or combinations thereof for implementing the image processing functionality disclosed herein. For example, the computing device may include one or more processors and memory for implementing instructions for implementing image processing functionality. As an example, the computing device 130 may be a desktop computer, a laptop computer, a tablet computer, or the like. The computing device may include a user interface for receiving user input and for displaying images. For example, the user interface may include, but is not limited to, a display, a keyboard, a mouse, and the like.

In accordance with embodiments, the image field reconstructed via off-axis digital holographic processing may be given by:

$$y(r) = h_c(r) \otimes (x(r) \cdot [h_c(r) \otimes i(r)]) \quad (1)$$

where r is the 2D spatial coordinate vector, y(r) is the image at the camera, x(r) is the sample's complex transmittance, i(r) is the illumination field at the sample, $h_c(r)$ is the system's coherent point spread function, and $\otimes$ is the convolution operator. Fourier transforming Eq. (1) leads to $$Y(\omega) = H_c(\omega) \cdot [X(\omega) \otimes [H_c(\omega) \cdot I(\omega)]] \quad (2)$$

where $\omega$ is the spatial coordinate vector, $Y(\omega)$, $H_c(\omega)$, $X(\omega)$, and $I(\omega)$ are the Fourier transforms of y(r), $h_c(r)$, x(r), and i(r) respectively, and $H_c(\omega)$ is defined as the system's transfer function. In the case of plane wave illumination, $i(r)=1$, $I(\omega)=\delta(\omega)$, and Eq. (2) becomes a spatially low pass filtering equation, $Y(\omega) = H_c(\omega) \cdot X(r)$, and $H_c(\omega)$ sets the system's diffraction limit by rejecting all spatial frequencies with magnitude beyond some cutoff, say $\omega_c$.

In the case of SI-DPM, where the +/−1 and 0 diffraction orders from DG1 interfere at the sample, the illumination field is $i(r) = 1 + m \cos(\omega_0 \cdot r + \varphi_n)$, where $|\omega_0| \leq \omega_c$ is the illumination's frequency vector, and m is the modulation depth of the pattern. Fourier transforming and substituting into Eq. (2), a single acquisition can have a Fourier distribution of the form, $$Y_n(\omega) = H_c(\omega) \cdot \left[ X(\omega) + \frac{m}{2} X(\omega - \omega_0) e^{-j\varphi_n} + \frac{m}{2} X(\omega + \omega_0) e^{j\varphi_n} \right] \quad (3)$$

Thus, a single raw acquisition is a superposition of diffraction-limited information and sub-diffraction content, incorporated into terms $X(\omega-\omega_0)$ and $X(\omega+\omega_0)$, which are frequency shifted into the system's passband. As with SIM, SI-DPM phase-steps i(r) to linearly solve for $X(\omega)$, $X(\omega-\omega_0)$, and $X(\omega+\omega_0)$ before demodulating them back to their appropriate positions in Fourier space. Rotating i(r) allows reconstruction of the final image with isotropic sub-diffraction resolution. For the experimental results below, the final sub-diffraction resolution reconstructions use two orthogonal rotations with 3 phase steps per rotation. Sub-diffraction resolution phase imaging via SI-DPM (broadband illumination) is compared to that via SI-QPM (laser illumination) and the increase in image quality is emphasized.

In experiments, phase imaging of a calibration target, taken with a 10× imaging objective (NA 0.25), was demonstrated. The diffraction-limited and sub-diffraction resolution imaging with laser illumination ($\lambda$=632 nm) and broadband illumination ($\lambda$=632±10 nm) were compared. In both cases, the diffraction limited resolution is 2.0 µm. With structured illumination, the maximum achievable resolution is enhanced by a factor of two over the diffraction limit to 1.0 µm. The target was a transparent PDMS mold (n=1.4) of the surface of a high-res USAF test chart, mounted in air ($\Delta n$=0.4). The chrome deposits on the USAF test chart are D=~100 nm high, and leave imprints in the PDMS mold. Thus, the PDMS mold acts as a calibrated phase target, where the imprints are the phase features of interest. The expected phase delay imparted by these features is $\Delta\varphi = 2\pi \Delta n D/\lambda \approx 0.4$ rad. In FIG. 4, the quantitative phase images under laser illumination (FIGS. 4A and 4B) are compared with those under broadband illumination (FIGS. 4C and 4D). FIGS. 4A and 4C are typical diffraction-limited phase images but FIGS. 4B and 4D are specifically the sub-diffraction resolution reconstructions via SI-QPM and SI-DPM, respectively. Close up views of the Group 8 Elements 4-5 in FIGS. 4A, 4B, 4C, and 4D are shown in FIGS. 4E, 4F, 4G, and 4H, respectively. As seen, images taken with broadband illumination show far superior quality compared to their counterparts taken with laser illumination, which are significantly corrupted by coherent noise such as speckle or Airy patterns from imperfections in the system. The benefits of SI-DPM over SI-QPM are especially visible when comparing FIGS. 4F and 4H—the coherent artifacts from laser illumination are indistinguishable from the actual features on the sample (assuming no prior knowledge of sample structure) because they both impart comparable phase delays to the image. Thus, though the sample features theoretically lie within the frequency support of the enhanced resolution image, they require low phase noise for visualization and are effectively irresolvable with laser illumination. The variance of phase noise is decreased from 0.06 rad in the case of SI-QPM to 0.001 rad in the case of SI-DPM. It is noted that the phase noise can be further decreased if broader illumination bandwidth is used. FIGS. 4I and 4J compare diffraction-limited (WF) and SI-DPM cross cut phase profiles from FIGS. 4G and 4H that demonstrate sample path lengths with phase differences well matched with the expected $\Delta\varphi$=0.4.

FIGS. 5A-5H demonstrates SI-DPM in imaging endothelial progenitor cells (EPC). In this experiment, a 20× imaging objective (NA 0.4) was utilized, resulting in a diffraction limited resolution of 1.2 µm. Scale bars in the upper right correspond to 10 um. Due to their high transmittance and low absorption, these cells act as biologically relevant phase samples. FIGS. 5A-5H compares diffraction limited and sub-diffraction resolution phase imaging of the cells under laser and broadband illumination conditions. As expected, much of the coherent noise in FIGS. 5A and 5B is suppressed, leading to much cleaner phase images in FIGS. 5C and 5D. FIGS. 5E, 5F, 5G, and 5H show zoomed-in views of a select intracellular region-of-interest (ROI) from FIGS.

5A, 5B, 5C, and 5D, respectively, that allow close inspections of the image quality near the nucleus of an EPC. It is noted that in the diffraction-limited and sub-diffraction resolution images via laser illumination (FIGS. 5E and 5F), a significant contribution to the overall signal is the Airy rings from imperfections in the optical system. Especially in FIG. 5F, much of the sub-diffraction resolution information is drowned out by the coherent noise background. In contrast, FIG. 5H shows significant decrease in coherent noise via broadband illumination and allows easy and high contrast visualization of many of the sub-diffraction resolution features.

Another example of SI-DPM is shown in FIGS. 6A-6H that emphasizes the effects of sub-diffraction resolution in the presence of reduced coherent noise. Mesenchymal stem cells were imaged under blue broadband (450±20 nm) illumination with a 40× imaging objective (NA 0.6). These cells were isolated from umbilical cord blood. The cells were seeded using a density of $50 \times 10^4$ cells/cm$^2$ on 4-well glass chambers, incubated with 3.3 μg/ml of fibronectin for one hour prior to seeding, and cultured in Minimum Essential Medium Alpha Medium (Gibco) supplemented with 20% fetal bovine serum, 1% antibiotic-antimycotic solution, and 1% L-Glutamine. After 48 hours of culture, the cells were fixed with cold methanol for 5 minutes. FIGS. 6A and 6B below compares diffraction-limited and sub-diffraction resolution phase imaging, respectively, of the intracellular components of a single mesenchymal stem cell under broadband illumination. The resulting low coherent noise allows clear comparisons of the resolution improvements when comparing between FIGS. 6A and 6B, where the resolution enhancement in FIG. 6B allows clear and high-contrast visualization of sub-diffraction features with less than 0.1 radians of phase shift. With laser illumination, such slight shifts may be significantly corrupted by coherent noise. Close-up views are shown for three select regions-of-interest (ROIs) that highlight the enhanced visualization capability for intracellular structures. ROIs shown in FIGS. 6C, 6F, FIGS. 6D, 6G, and FIGS. 6E, 6H compare the diffraction-limited and sub-diffraction resolution images of an extension of the cellular matrix, boundary of the cell nucleus, and a cluster of cellular protein, respectively. In all cases, the benefits of sub-diffraction resolution imaging are evident, and are possible mainly due to reduced coherent noise.

Although noise was reduced primarily through broadband illumination in the examples disclosed herein, comparable noise reductions (and resolution improvements) may be achieved with monochromatic light through increased angular incidences at the sample. Such techniques may require acquiring many raw images with varying illumination angles for an acceptable level of coherent noise reduction, most of which may be unnecessary from the point of view of resolution enhancement. Systems in accordance with the present subject matter may use broadband illumination for noise reduction. Suitable results can be obtained with only 4-6 raw acquisitions. Thus, especially for studies regarding the biological dynamics of living cells, this technique can allow all the benefits of faster acquisition.

The present disclosure introduces SI-DPM as a technique to obtain sub-diffraction resolution phase imaging with broadband illumination, which can dramatically reduce coherent noise and thus allow better phase sensitivity. This allows high contrast, sub-diffraction resolution, quantitative visualization of phase structures imparting phase shifts on the order of nanometers. Furthermore, this high-contrast visualization can be accomplished without use of any extrinsic contrast agents and comes from purely the intrinsic optical path delays in the cell due to cellular structure.

Figure 7:
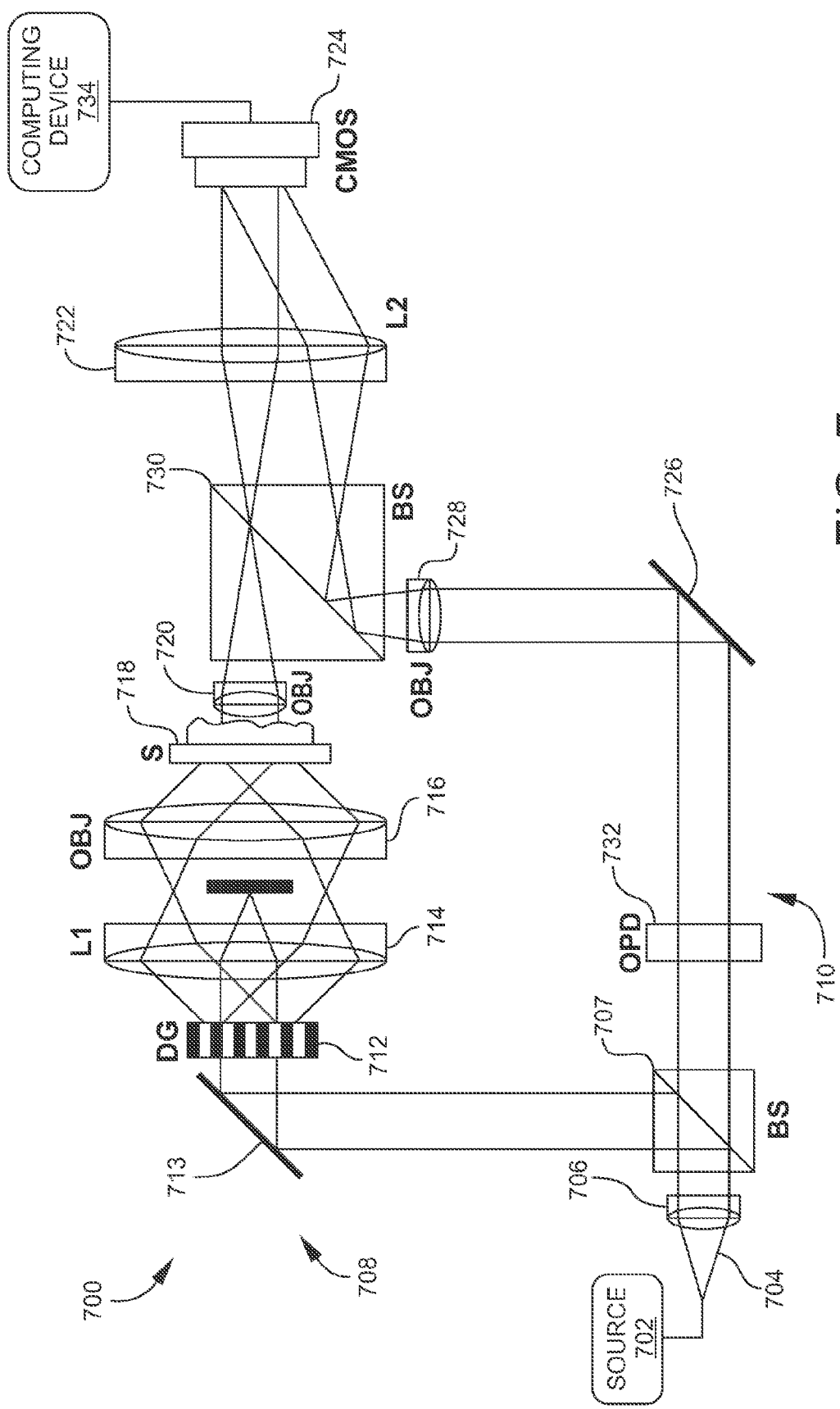
FIG. 7 is a schematic diagram of another example imaging system, generally designated 700, in accordance with embodiments of the present subject matter.

In accordance with embodiments, an imaging system is provided that is based on a Mach-Zehnder off-axis interferometric transmission microscopic configuration. For example, FIG. 7 is a schematic diagram of another example imaging system, generally designated 700, in accordance with embodiments of the present subject matter. Referring to FIG. 7, the system 700 includes a light source 702 configured to generate a single mode, 532 nm, Gaussian beam of light 704. The light 704 is directed by a lens 706 to a beamsplitter 707, where the light 704 is split into a sample arm (generally designated 708) and a reference arm (generally designated 710) of a Mach-Zehnder interferometer. In the sample arm 708, the light 704 is further split into diffraction orders by a diffraction grating 712. A mirror 713 may be positioned for directing light output by the beamsplitter 707 towards the diffraction grating 712. The diffraction orders of the light output by the diffraction grating 712 may then be fed through a 4f system, including a lens L1 714 and objective OBJ 716, and then filtered so that only the +/−1 orders interfere at the sample to create a sinusoidal structured pattern. The system provides that the sinusoidal pattern is at the edge of the passband set by the objective 716 in this 4f system. Following the objective 716, a sample holder 718 can hold a sample in the path of the light output from the 4f system.

The transmitted diffraction pattern from the sample held by the sample holder 718 is then coherently imaged by a second 4f system, including an objective 720 and a lens L2 722, to a light detector 724. The light detector 724 may include a CMOS camera. It is noted that both 4f systems can use objectives of equal numerical aperture. The coherent image at the CMOS camera can then be interfered by an off-axis reference wave from the reference arm 710 to allow amplitude/phase reconstruction. The illumination pattern may be phase-stepped and rotated to obtain enhanced resolution. Fourier space may be filled by mounting the diffraction grating 712 on a rotational mount and lateral translation stage.

Referring now to the reference arm 710, the portion of the light 704 entering the reference arm 710 may be directed by a mirror 726 to an objective 728. A beam splitter 730 may receive the light from the reference arm 710 and combine it with the light exiting the sample arm 708. The combination of light from the sample arm 708 and the reference arm 710 may thereby be combined for projection onto the light detector 724. It is noted that the component OPD 732 represents an optical path different between the paths of light in the sample arm 708 and the reference arm 710.

The image detector 724 may be operatively connected to a computing device 734 for communication of the image data to the computing device 734 for processing. The computing device 130 may apply reconstruction to the image data for generating an image of the sample in accordance with embodiments of the present disclosure.

The system 700 shown in FIG. 7 was verified in experiments by imaging a 1951 USAF test target at subdiffraction levels, where the diffraction limit for the objective allowed visualization of 1 μm features. The test target included opaque chrome bars set on a transparent glass background and is imaged transmissively. It is noted that the target was imaged as an amplitude object and therefore only compared the diffraction limited and extended resolution amplitude images of the object below.

In FIGS. 8A-8H, an example is provided of the off-axis holographic processing that was needed for this example to get amplitude and phase field information at the image plane from a single acquisition in the orthogonal (FIGS. 8A-8D) and structured illumination (FIGS. 8E-8H) cases. In both cases, the raw detected image is the interference pattern (FIGS. 8A and 8E) generated at the image plane of the camera when the coherent image of the sample is mixed with the off-axis reference plane wave. In the case of structured illumination of the sample (FIG. 8E), however, the coherent image includes the structured interference at the sample and thus the net raw interferogram consists of competing interferences between the normal carrier frequency from the off-axis configuration and the sample's structured illumination. The region of Fourier space corresponding to the sample image information (outlined by the dashed circle in (FIGS. 8B and 8E)) was digitally filtered and DC centered and inverse Fourier transformed to reconstruct the final image (FIGS. 8D and 8H). In the amplitude image in the case of structured illumination (FIG. 8H), the sinusoidal pattern is shown as being overlaid on the sample structured. Phase stepping this pattern, allowed enhanced resolution reconstruction, as described in further detail herein.

Figure 9A:
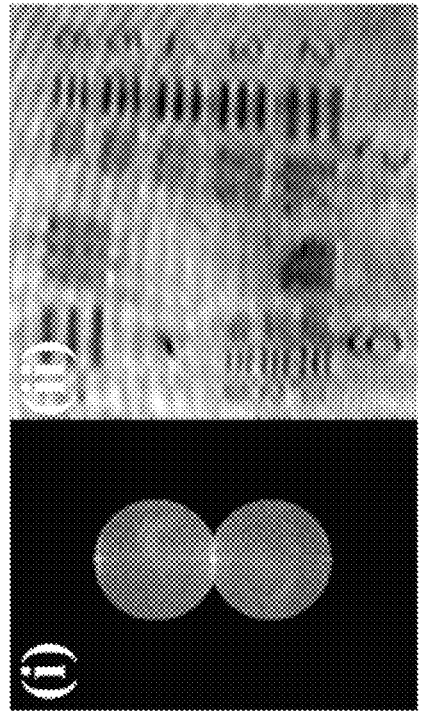
FIGS. 9A-9D depict images of enhanced resolution reconstruction showing Fourier spectra (i) and associated amplitude of inverse Fourier transform (ii)
Figure 9B:
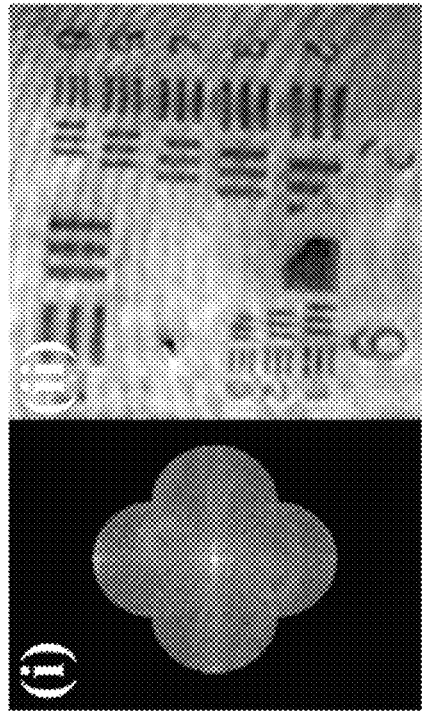
Figure 9C:
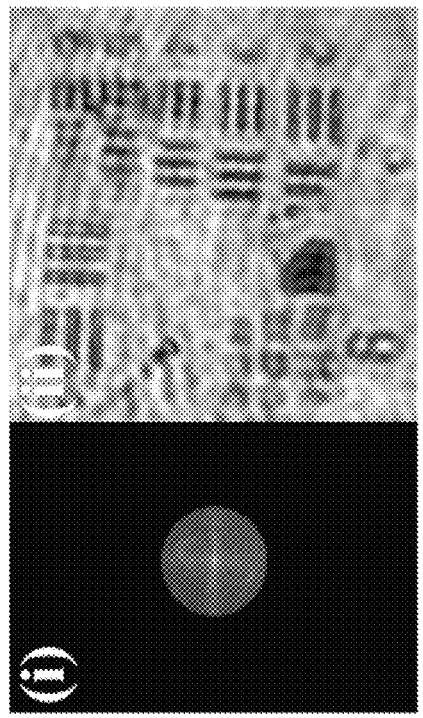
Figure 9D:
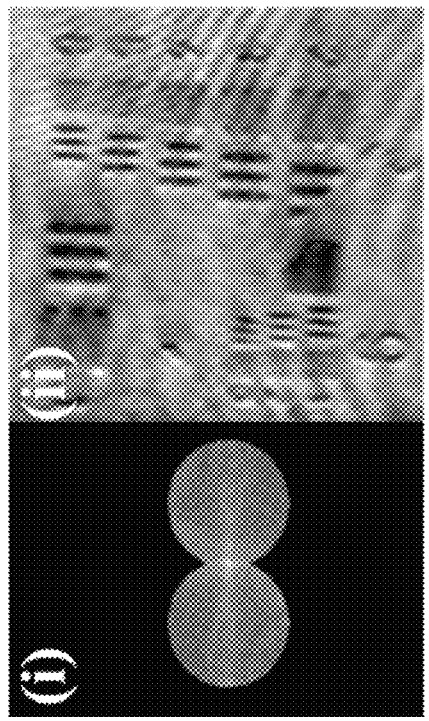

Four raw acquisitions, such as is shown in FIG. 8E, were taken with incrementally phase stepped illuminations at each rotation. It is noted that from Eq. (7), theoretically one is able to reconstruct an extended resolution image by taking only 2 phase-stepped raw acquisitions per rotation; taking more, however, increases SNR and fidelity of reconstruction. In FIGS. 9B and 9C, it is shown that the extended resolution component images and their corresponding Fourier spectrum for sinusoidal illumination rotations of 0° and 90°. The images of FIGS. 9B and 9C can be added to get FIG. 9D, which is the final extended resolution reconstruction. The extended resolution information in FIG. 9D allows clear and sharp visualization of the USAF Group 9 bars, which are all beyond the original diffraction limit and completely blurred out in the diffraction limited image (FIG. 9A). It is noted here that Fourier space has been filled out with only two rotations. By using more rotations, the Fourier space can be filled out more isotropically with a linearly growing computation cost.

In accordance with embodiments, a technique disclosed herein was used to demonstrate extended resolution quantitative phase imaging. For this demonstration, a blazed diffraction grating was utilized as the sample, where the blazed grooves act as phase ramps spaced at D=1.6 μm apart, nearly half the diffraction-limited resolution of 3 μm. The grating is imaged in air ($n_1$=1). The quantitative phase images resulting from diffraction-limited versus enhanced-resolution imaging were compared. The procedure used to get enhanced resolution phase imaging is identical to that illustrated for amplitude imaging in FIG. 8, except that only the phase was considered, instead of amplitude, maps. Also, only use one orientation of structured illumination pattern was utilized since the grating only has spatial frequencies in one orientation.

To demonstrate the quantitative nature of the enhanced-resolution phase images, the expected phase values were simulated from imaging the blazed grating. The grating is made of glass B270 ($n_2$=1.523) and has a groove depth of 700 nm, which results in a phase delay of $\Delta\varphi_{ideal}=2\pi/\lambda D$ ($n_2-n_1$)=3.56 rad across the grating. The simulated phase profile (assuming constant amplitude transmittance) of this blazed grating with the dashed line in the graph (i) in FIG. 10D and show the associated power-spectrum in the graph (ii) in FIG. 10D. It is noted that this power spectrum is composed of distinct orders encoding the grating's periodic profile. From the Fourier diffraction theorem, this spectrum is exactly what can be seen at the pupil plane of the imaging objective. The system is designed such that the objective's aperture can physically only pass the $0^{th}$ order under orthogonal illumination. Inverse Fourier transforming to simulate diffraction-limited imaging, it can be seen that the resulting diffraction-limited image of the grating has a flat phase profile, as shown in the dashed line in FIG. 10D. This profile has no useful structural information about the sample. Using the enhanced resolution framework as disclosed herein, the net imaging bandwidth can be increased by a factor of two, which allows the +/−1 orders to be passed and allows the imaging of the fundamental spatial frequency of the grating, shown by the solid line in FIG. 10D. The maximum phase delay in this fundamental spatial frequency is found via simulation to be $\Delta\varphi_{SIPM}$=2.7 rad. The image information that accounts for the difference between $\Delta\varphi_{ideal}$ and $\Delta\varphi_{SIPM}$ lies in the orders beyond the +/−1, which lie beyond even by the enhanced resolution passband.

Further, experimental confirmation of these simulated results were performed. FIGS. 10A and 10B show the experimental quantitative phase images and associated Fourier spectra for diffraction-limited (WF) and enhanced resolution (SI-QPM) imaging, respectively, of the grating. Other than speckle noise, which is treated as a coherent imaging artifact, there is no sample structure seen in the WF phase image. In contrast, the grating's structure is clearly visible in the SI-QPM image. Cross-cuts of the WF and SI-QPM phase images were taken and plotted with respect to the ideal phase profile of the grating (FIG. 10E). As expected from the simulations, the WF cross-cut has no useful sample information while the SI-QPM cross-cut contains the grating's fundamental spatial frequency. The measured phase difference across the SI-QPM profile is $\Delta\varphi_{SIPM}$=2.57 rad, which is in good agreement with the expected 2.7 rad from simulation (within 5%) and thus demonstrates SI-QPM's ability to provide quantitative phase information at sub-diffraction resolution. The main contributor to any phase error is expected to be speckle noise, which has a variance measured to be $\sigma_{speckle}^2$=0.06 rad for this particular system.

Figure 11:
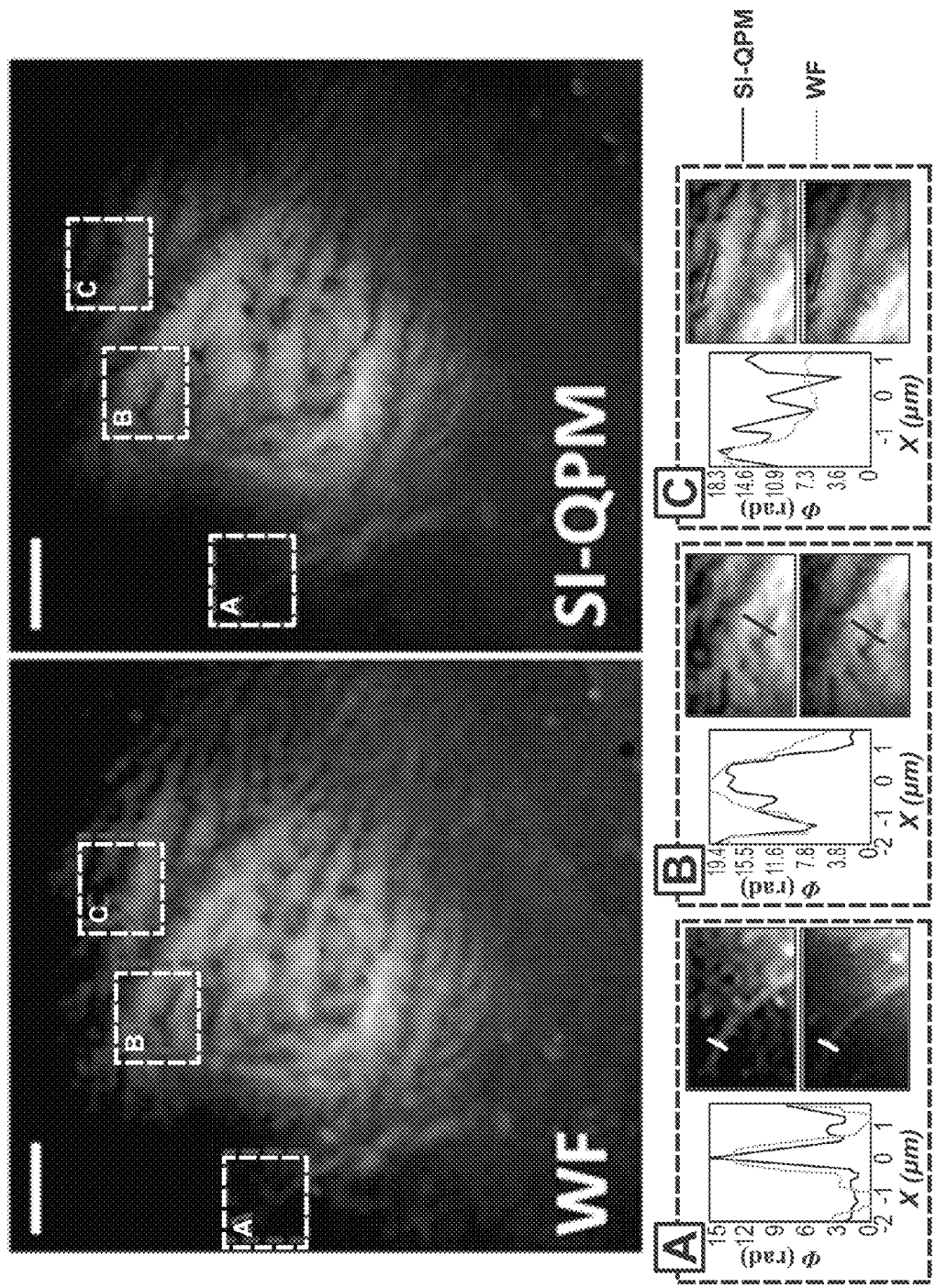
FIG. 11 depicts images and graphs showing a comparison of diffraction limited (WF) and enhanced resolution (SI-QPM) phase image of mesenchymal stem cells, where close-up comparisons of 3 regions (A,B,C) are shown below along with an associated line profile (marked by yellow), and where scale bars on upper left correspond to 10 µm.

Enhanced resolution imaging of more biologically relevant phase samples is shown. For this, mesenchymal cells were isolated from umbilical cord blood. Each cell type was seeded at a density of 50×10$^4$ cells/cm$^2$ on 4-well glass chambers (Lab-Tek). The samples were cultured for 48 hours before being fixed with cold methanol for 5 minutes. These samples were unstained and transparent and can be treated as pure phase objects. Thus, only diffraction-limited (WF) and extended resolution (SI-QPM) phase images of these cells were compared. In FIG. 11, a particular mesenchymal cell was isolated that was fixed while undergoing mitosis and image it using a 0.6 NA objective. Biologically, the nuclear material starts condensing at the start of mitosis in preparation of cell division. Indeed, it can be seen that much of the phase signal (i.e., longer optical path lengths) in FIG. 11 is localized to within the nucleus, where the heterogeneous distribution of condensed nuclear material is clearly visible with high signal and contrast. It is noted again that this high signal/contrast visualization of the cell is possible without any extrinsic contrast agents and comes from purely the intrinsic distribution of intracellular phase delays. This high signal/contrast visualization of the intricate nuclear condensate, in turn, offers many fine features that are resolvable only by enhanced resolution.

Three intracellular regions-of-interest (ROI) for close inspection (A, B, C) were selected that contain information about the nuclear material's morphology. ROI-A as shown in FIG. 11 focuses on an extension of the nuclear lamina that projects out into the cellular cytoplasm. ROI-B in FIG. 11 zooms in on a crevice between adjacent nuclear condensate, and ROI-C in FIG. 11 focuses on fine features at the edge of a single nuclear condensate. In all cases, the improvement of image quality due to the addition of enhanced resolution information is clearly visible when considering SI-QPM compared to WF. Cross-sectional line profiles were taken from each of these ROIs to quantitatively illustrate this resolution improvement, and it can be clearly seen tha finer fluctuations of intracellular phase delays for SI-QPM, corresponding to the finer features that are only present due to extended resolution.

It is noted that in SIM/SOIM systems, the sample is typically imaged via epi-mode, and thus the illumination and detection arms of the system share the same limiting aperture. Therefore, maximum resolution gain can be achieved when the illumination spatial frequencies are set to the edge of the system passband, which results in a factor of two improvement over the diffraction limit. Analogously, the illumination and detection arms of the SI-QPM system that are disclosed herein have equal numerical aperture and thus the theoretical resolution is also twice the diffraction limit. However, unlike SIM/SOIM, the SI-QPM system images the sample through a transmission configuration, and thus the limiting apertures for illumination and detection are physically distinct. Thus, a larger NA can be used for illumination than detection. This would allow greater than 2× the diffraction-limited resolution (with respect to the detection NA), allowed by the greater illumination NA, with all the benefits of larger field-of-view and longer depth-of-field, as allowed by the lower detection NA. This transmission configuration for SI-QPM is used since many of samples of interest back-scatter negligibly. If a sample does largely back-scatter, phase information will be less relevant and it will be optically simpler to achieve extended resolution imaging via SOIM.

Further, it is noted that the mathematical similarity between SI-QPM and SIM reconstruction. In SIM, the measured intensity distribution at the image plane is a linear transform of the fluorescent emission distribution at the sample, and thus super-resolution reconstruction requires a simple linear inversion process. In SI-QPM, the sample is illuminated with a coherent field, and therefore the measured field pattern at the image plane is a linear transform of the complex transmittance at the sample plane. Thus, extended-resolution via SI-QPM is achieved linearly. This is in direct contrast to SOIM, where the measured intensity at the image plane is not linearly related to the amplitude transmittance, and hence extended-resolution must be obtained by solving a non-linear system.

A significant difference between SIM and SI-QPM is that SI-QPM images the sample through coherent diffraction, not fluorescent emission. Thus, when the sinusoidal structured pattern is created on the sample via 2-beam interference, oblique illumination microscopy is essentially implemented for each illumination beam. This directly leads to the realization that each individual illumination beam multiplexes regions of frequency content, individually diffraction limited but shifted over different regions of the sample's spectrum, into the system's detection aperture. The reconstruction process is then essentially a separation of these multiplexed components and though the final reconstructed image has a frequency support greater than that of the diffraction-limit, each enhanced-resolution component can be gotten by a single, correctly-oriented, illumination beam. This is in contrast to SIM, where the achieved resolution gain cannot be attributed to any single beam, regardless of orientation.

Thus, though the post-processing math for SIM and SI-QPM are almost identical, the associated optical phenomena are vastly different, and we refrain from using "super-resolution," a phrase often associated with SIM, to describe SI-QPM, which we associate more closely with synthetic aperture techniques. The same can be said of SOIM.

In the end, however, SI-QPM (and SOIM) allows imaging of samples at resolution levels up to twice the diffraction limited resolution. Furthermore, it allows high contrast, quantitative, sub-diffraction imaging of phase samples, a class of samples that has remained largely untouched by most sub-diffraction imaging. This, of course, finds particularly biological relevance when imaging cells that are inherently transparent. Conventional methods to image such cells with high contrast and resolution may include fixing and staining the cells, which kills the cells, or using fluorescent tags, which may affect cellular function dynamics. SI-QPM offers an alternative to obtain high contrast, high resolution images of cell morphology and dynamics with minimal sample preparation.

SI-QPM disclosed herein combines structured illumination microscopy with quantitative phase microscopy to allow extended resolution imaging of phase and amplitude samples. This concept is shown herein for enhanced resolution imaging of a calibrated test target (amplitude object), a blazed phase grating with known profile (phase object), and mesenchymal cells. In both cases, high contrast images were reconstructed that had a spatial frequency support exceeding that of the system's diffraction limit. This work has particular relevance towards imaging of unstained and largely transparent cells, where the information is encoded in the sample's phase rather than amplitude distribution. Thus, being able to image sub-diffraction features on a phase object is a unique and biologically important ability that SI-QPM allows.

Regarding theory, the basics of complete reconstruction (amplitude and phase) of a sample by off-axis digital holography are described in the following. Consider the complex amplitude transmittance of a sample, given by x(r), under some illumination field pattern, given by i(r), that is optically passed through a system and generates a coherent image at the camera, given by y(r). Here, r is the 2D spatial coordinate vector. This coherent image is then interfered by an off-axis reference wave, given by $U_r(r)=\exp(-j\ k \cdot r)$, where we disregard proportionality constants for mathematical simplicity and k is defined as the direction vector. The net interference pattern at the camera may then be given by:

$$n(r)=|y(r)+U_r(r)|^2=1+|y(r)|^2+y(r)\exp(-j\ k \cdot r)+y^*(r)\exp(j\ k \cdot r) \quad (4)$$

It can be seen that the third and fourth terms contain the complete image information multiplied by opposite phase shifts. These spatial multiplications by the phase shifts results in frequency shifts of the image information by k·r and −k·r in Fourier space. If the optical system is designed such that these frequency shifts separate the image spectra from the DC-centered support of the first two terms of Eq. (4), then y(r) can be completely reconstructed via digital filtering and simple Fourier manipulations.

In typical SIM, because the fluorescent, spatially incoherent, emission is detected from the sample, the intensity at the image plane is a linear transform of the sample structure. Here, it is noted that because the sample is not fluorescent, the spatially coherent diffraction is detected, and thus the image field is a linear transform of the sample transmittance function. Assuming that the illumination and detection arms of the optical system are both limited by the same numerical aperture, we can write $$y(r) = h_c(r) \otimes [x(r) \cdot [h_c(r) \otimes i(r)]] \quad (5)$$

where $\otimes$ is the convolution operator, $h_c(r)$ is the system's coherent point spread function, and the steps outlined above were taken to recover y(r) from holographic raw data. Fourier transforming, the following equation results:

$$Y(\omega) = H_c(\omega) \cdot [X(\omega) \otimes H_c(\omega) \cdot I(\omega)] \quad (6)$$

where $Y(\omega)$, $H_c(\omega)$, $X(\omega)$, and $I(\omega)$ are the Fourier transforms of y(r), $h_c(r)$, x(r), and i(r) respectively, and $H_c(\omega)$ is defined as the system's transfer function. In the case of plane wave illumination, where i(r)=1 and thus $I(\omega) = \delta(\omega)$, we see that Eq. (6) becomes the simple low pass filter equation, $Y_{BF}(\omega) = H_c(\omega) \cdot X(r)$, where $H_c(\omega)$ sets the system's diffraction limit. From coherent diffraction theory, we know that $H_c(\omega)$ acts as a tophat filter that sharply rejects spatial frequencies with magnitude beyond some cutoff, say $\omega_c$, and passes all other frequencies.

Now, a description is provided of how to obtain an enhanced resolution image containing spatial frequencies $|\omega| > \omega_c$ without physically using a larger aperture. In the case of an illumination field set by two interfering beams, $i(r) = \cos(\omega_0 \cdot r + \varphi_n)$, where $|\omega_0| \leq \omega_c$ is the illumination's frequency vector. Fourier transforming and substituting into Eq. (6), we see that the corresponding acquisition will have a Fourier distribution of the form, $$Y_n(\omega) = H_c(\omega) \cdot [X(\omega - \omega_0)e^{-j\varphi_n} + X(\omega + \omega_0)e^{j\varphi_n}] \quad (1)$$

Here, as in conventional SIM, we see that this raw acquisition contains high frequency content beyond the diffraction limit, incorporated into terms $X(\omega - \omega_0)$ and $X(\omega + \omega_0)$, shifted into system's passband. As in conventional SIM, by phase-stepping i(r), we can linearly solve for $X(\omega - \omega_0)$ and $X(\omega + \omega_0)$ and demodulate them back to their appropriate positions in Fourier space to reconstruct the image $Y_{SI}(\omega) = H_{eff}(\omega) \cdot X(r)$, where $H_{eff}(\omega)$ is now the effective system transfer function of plane wave illumination given by $$H_{eff}(\omega) = H_c(\omega - \omega_0) + H_c(\omega + \omega_0) \quad (2)$$

It is clear from Eq. (5) that $H_{eff}(\omega)$ has a larger frequency support than $H_c(\omega)$, and thus $Y_{SI}(\omega)$ is more highly resolved than $Y_{BF}(\omega)$ along the orientation set by $\omega_0$. As in conventional SIM, we fill out Fourier space by repeating this procedure for rotations of the illumination pattern. Maximal resolution gain is achieved when $|\omega_0| = \omega_c$, and corresponds to a gain by a factor of two. Conventional deconvolution procedures can be used to reshape the final transfer function before inverse Fourier transforming to reconstruct the enhanced-resolution image, which has amplitude and quantitative phase information of the sample at sub-diffraction resolutions. This technique is referred to as structured-illumination quantitative phase microscopy (SI-QPM).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C-++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An imaging system comprising:
   a light source configured to generate spatially coherent light;
   a diffraction grating positioned to receive and diffract the spatially coherent light;
   a sample holder positioned to receive the diffracted spatially coherent light for transmission through a sample;
   another diffraction grating positioned to form three mutually coherent beams of 0 and +/−1 order and containing sample information;
   a spatial filter in a Fourier plane positioned to filter the 0 order coherent beam to form a phase-stable off-axis reference beam;
   an image detector positioned to receive both the diffracted spatially coherent light transmitted through the sample and the phase-stable off-axis reference beam, and the image detector being configured to generate image data based on the received light and the off-axis reference beam; and
   a computing device configured to apply subdiffraction resolution quantitative phase reconstruction to the image data for generating an image of the sample.

2. The imaging system of claim 1, wherein the light source is a broadband illumination source.

3. The imaging system of claim 1, wherein the diffraction grating is configured to output the light at +/−1 and 0 orders.

4. The imaging system of claim 3, wherein the +1 order contains sample information, and wherein the +1 order is interfered with the 0 order functioning as a reference wave at the image detector.

5. The imaging system of claim 1, wherein the another diffraction grating is configured to pass the $0^{th}$ order of the light and effect spectral spreading for the one or more non-0 orders of the light.

6. The imaging system of claim 1, further comprising a 4f lens system positioned to receive light output by the diffraction grating and to output the light towards the sample holder.

7. The imaging system of claim 1, further comprising a 4f lens system positioned to receive light transmitted through the sample and to output the light in a direction towards the image detector.

8. The imaging system of claim 1, wherein another diffraction grating is positioned to receive light transmitted through the sample and to output the light in a direction toward the image detector.

9. The imaging system of claim 1, wherein the computing device comprises a display configured to display the image of the sample.

10. The imaging system of claim 1, further comprising:
    a sample arm comprising the diffraction grating and the sample holder; and
    a reference arm for directing a portion of light output by the broadband illumination source to the image detector.

11. A method of imaging, the method comprising:
    generating spatially coherent light;
    positioning a diffraction grating to receive the spatially coherent light and to diffract the spatially coherent light;
    positioning a sample holder to receive the diffracted spatially coherent light for transmission through a sample;
    positioning another diffraction grating to form three mutually coherent beams of 0 and +/−1 order and containing sample information;
    positioning a spatial filter in a Fourier plane to filter the 0 order coherent beam to form a phase-stable off-axis reference beam;
    positioning an image detector to receive both the diffracted spatially coherent light transmitted through the sample and the phase-stable off-axis reference beam, and the image detector being configured to generate image data based on the received light and the off-axis reference beam; and applying subdiffraction resolution quantitative phase reconstruction to the image data for generating an image of the sample.

12. The method of claim 11, wherein generating light comprises using a broadband illumination source to generate the light.

13. The method of claim 11, wherein the diffraction grating is configured to output the light at +/−1 and 0 orders.

14. The method of claim 13, wherein the +1 order contains sample information, and wherein the +1 order is interfered with the 0 order functioning as a reference wave at the image detector.

15. The method of claim 11, wherein the another diffraction grating is configured to the $0^{th}$ order of the light and effect spectral spreading for the one or more non-0 orders of the light.

16. The method of claim 11, further comprising positioning a 4f lens system to receive light output by the diffraction grating and to output the light towards the sample holder.

17. The method of claim 11, further comprising positioning a 4f lens system to receive light transmitted through the sample and to output the light in a direction towards the image detector.

18. The method of claim 11, wherein the another diffraction grating is positioned to receive light transmitted through the sample and to output the light in a direction toward the image detector.

19. The method of claim 11, further comprising displaying the image of the sample.

20. The method of claim 11, further comprising:

providing a sample arm comprising the diffraction grating and the sample holder; and providing a reference arm for directing a portion of light output by the broadband illumination source to the image detector.

21. The imaging system of claim 3, wherein the light output at 0 orders comprises the off-axis reference light.

22. The method of claim 13, wherein the light output at 0 orders comprises the off-axis reference light.

* * * * *